(12) United States Patent
Hetherington et al.

(10) Patent No.: US 6,169,732 B1
(45) Date of Patent: Jan. 2, 2001

(54) METHOD AND APPARATUS IN A WIRELESS COMMUNICATION SYSTEM

(75) Inventors: Mark Hetherington, Crystal Lake; Lee Michael Proctor, Cary, both of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/342,541

(22) Filed: Jun. 29, 1999

(51) Int. Cl.[7] ................................................. H04J 13/00
(52) U.S. Cl. ............................................................ 370/335
(58) Field of Search ................................... 370/389, 401, 370/465, 335, 311, 216, 241, 252, 441, 442, 342, 341, 320, 351, 431, 471, 253, 237, 229, 218; 455/524, 525, 516, 517

(56) References Cited

U.S. PATENT DOCUMENTS 5,590,177 * 12/1996 Vilmur et al. ........................ 370/335
5,594,718 * 1/1997 Weaver ................................. 370/335

* cited by examiner

*Primary Examiner*—Dang Ton (57) ABSTRACT

A method and apparatus in a communication system includes establishing a communication link between a first and second mobile communication resources (111, 114) via a series of land-based communication resources (121, 131, 132, 124) which have a first and last ((121,131), (132, 125)) land-based communication resources. The first and second mobiles (111, 114) have a first and last wireless connection (161, 164) respectively. The first mobile (111) transmits in sequence sequentially numbered packets of data via the first wireless connection (161) to the first land-based communication resource (121, 131). A detecting communication resource, including one of the land-based communication resources (121, 131, 132, 124), detects reception of out of sequence packets of data, and transmits out of sequence the sequentially numbered packets of data to communication resources subsequent in series to the detecting communication resource including the second mobile (114) via the last wireless connection (164).

8 Claims, 5 Drawing Sheets

MRLP UPLINK PROCESSING ALGORITHM

METHOD AND APPARATUS IN A WIRELESS COMMUNICATION SYSTEM

RELATED FIELD OF THE INVENTION

The invention relates generally to communication systems.

BACKGROUND OF THE INVENTION

A communication system may include a series of land-based communication resources connecting a number of mobile stations to one or more land-based end points, for example at a public switching telephone network. In such communication systems, a mobile station (MS) may also make a connection to another MS for communicating data and voice information. The link between an MS and the first in the series of the land-based communication resources normally is via a wireless link with limited communication bandwidth. In case of MS to MS communication, the connection may involve at least two wireless links, one between the source MS and the first in the series of the land-based resources, and another between the destination MS and the last in the series of the land based resources. The limited communication bandwidth of the wireless links between the MS and the land-based communication resources limits the overall communication system bandwidth when the bandwidth is used to recover data lost due to inadequacy of the wireless links, such as low signal to interference ratio of the links signals.

Therefore, there is a need for a method and apparatus in a communication system that makes efficient use of the communication system bandwidth.

DETAILED DESCRIPTION OF THE PREFERRED EMBODIMENT(S)

According to one or more aspects of the invention, a communication link between a first and second mobile communication resources is established via a series of land-based communication resources. The land-based communication resources have at least a first and last land-based communication resource. The first mobile communication resource may have a first wireless connection, as a first part of the communication link, with the first land-based communication resource, and the second mobile communication resource may have a second wireless connection, as the last part of the communication link, with the last land-based communication resource. The first mobile communication resource transmits in sequence sequentially numbered packets of data via the first wireless connection to the first land-based communication resource for subsequent transmission to the second mobile communication resource via the communication link. A detecting communication resource detects reception of out of sequence packets of data received at a receiving portion of its transceiver section. The detecting communication resource may be at least one of the series of land-based communication resources. The detecting communication resource transmits out of sequence the sequentially numbered packets of data from a transmitting portion of its transceiver section to communication resources subsequent in series to the detecting communication resource. As such, the communication system makes efficient use of the system bandwidth.

A communication link between two mobile communication resources for communication of data information may be according to IS-99, IS-707 or IS-707A standard. A copy of the standard may be obtained via a world wide web site located at www.tiaonline.org, or by writing to Telecommunications Industry Association, 1300 Pennsylvania Ave., Suite 350, Washington, D.C. 20004 USA. According to the standard communication protocol, such as radio link protocol (RLP), significant reduction of communication bandwidth may result due to requirement of buffering data by a base station controller (BSC) when data packets of a frame of data arrive out of sequence. The arrival of out of sequence packets of data may be due to erasure of one or more packets of data at the first wireless connection. When a mobile station makes the first wireless connection, such as an up-link wireless communication, with an BSC, the standard protocol requires BSC to buffer the data frames, and request for retransmission of the missing packets of data when packets of data are arrived out of sequence. This process requires a waiting time until all packets of data of a frame of data arrive at the BSC. Waiting for up-link data re-transmissions leads to inefficient use of a down-link connection such as the second wireless connection between the last land-based communication resource and the second mobile communication resource. During the waiting period, idle frames are transmitted on the down-link which leads to loss of opportunity to transmit data on the down-link portion of the communication link between the first and the second mobile communication resources. The mobile communication resources may be mobile stations such as handheld communication units, and the land-based communication resources may be BSCs, base transceiver stations (BTSs) or any inter-working units (IWUs.)

Figure 1:
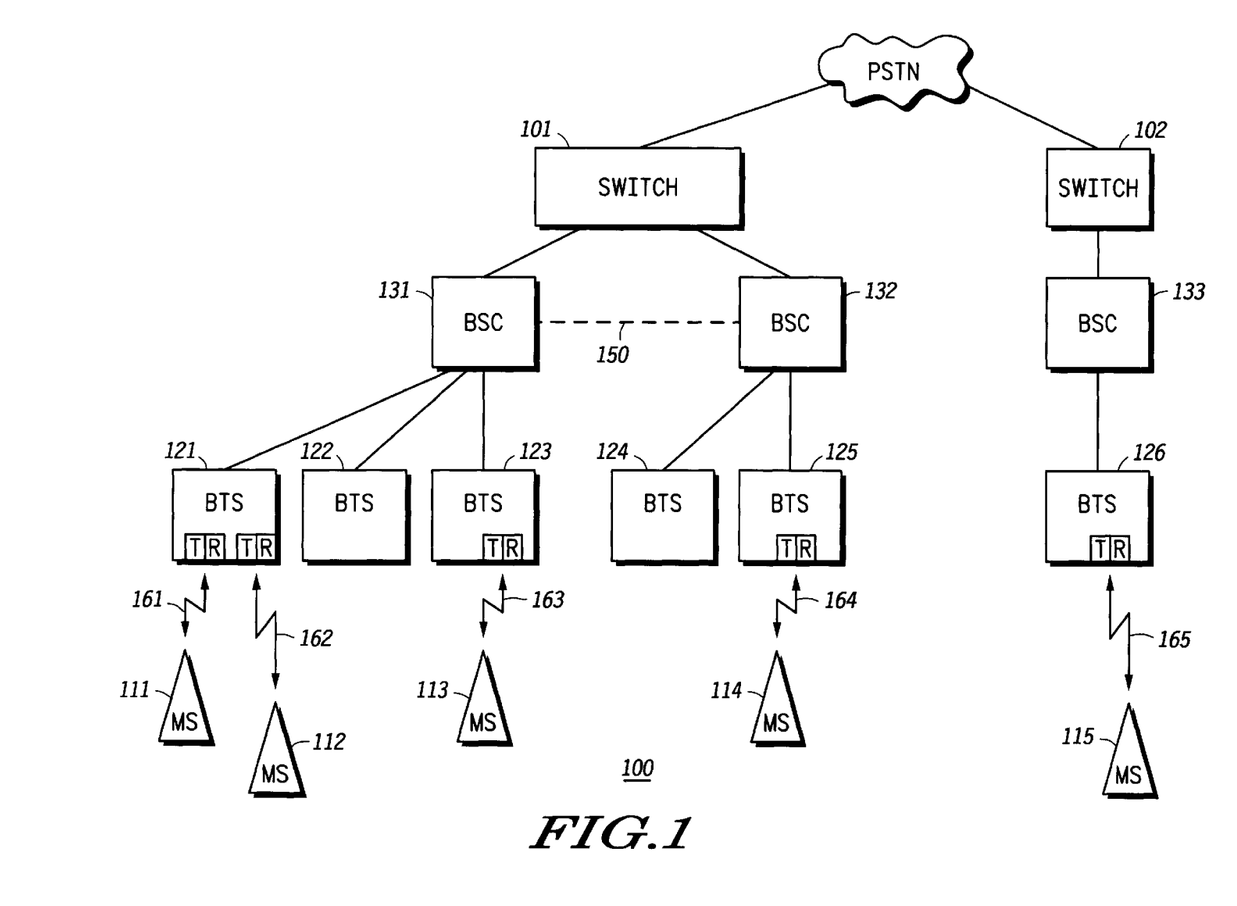
FIG. 1 depicts a block diagram of a communication system.

One or more advantages of the invention for efficient use of available bandwidth of wireless links may be more apparent by making references to a communication system 100 shown in FIG. 1. Communication system 100 may include a number of mobile communication resources such as mobile stations 111–15. Each mobile station communicates with at least one BTS, such as BTSs 121–26. Each BTS has a transceiver section for transmitting and receiving via at least one wireless connection with a mobile station. Each BTS is connected to a base station controller (BSC), such as BSCs 131–33, that generally controls operation of one or more BTSs. An BSC may also be called a centralized BSC (CBSC.) Two or more BSCs may be connected together via a logical connection 150. The communication system 100 may also include one or more switches such as switches 101 and 102 essentially connecting a number of BSCs to a public switch telephone network (PSTN.)

Communication system 100 provides communication links between at least two mobile communication resources, for example, mobile stations 111 and 114. To establish a communication link between mobile stations 111 and 114, a communication link via a series of land-based communication resources may need to be established. Such land-based communication resources may include BTS 121, BSC 131, BSC 132 and BTS 125. BTS 121 is the first and BTS 125 is the last land-based communication resources in the series of the communication resources. BTS 121, the first communication resource, may have a wireless link 161, possibly of an up-link type, with mobile station (MS) 111, and BTS 125 may have a wireless link 164, possibly of a down link type, with the mobile station 114. The wireless links 161 and 164 may be the first and last parts of the communication link between the mobile stations 111 and 114 through the land-based communication resources. Other communication links between different mobile stations are also possible which may require fewer or more number of land-based communication resources. For example, in case of MS 111 and 112, only the BTS 121 may be involved from the land-based communication resources. A wireless link 162 is between BTS 121 and MS 112. In case of MSs 111 and 113, BTS 121, BSC 131 and BTS 123 may be involved. A wireless link 163 is between BTS 123 and MS 113. In yet another example of a communication link between MSs 111 and 115, the land-based communication resources may involve BTS 121, BSC 131, switches 101 and 102, BSC 133 and BTS 126. A wireless link 165 is between MS 115 and BTS 126.

According to the invention, for example in case of the communication link between MS 111 and 114, BTS 121 and BSC 131, as a combined land-based communication resource, may be a detecting land-based communication resource detecting reception of out of sequence of data transmitted from MS 111. A transmitting portion of BTS 121 and BSC 131 transmits the packets of data out of sequence as it was received without interruption of the communication link. At the same time or shortly after that, BTS 121 requests from MS 111 to re-transmit the missing packets of data. At the same time, the packets of data are transmitted out of sequence down the communication link via various subsequent land-based communication resources until the data packets arrive out of sequence at the destination mobile station 114. By the time the entire out of sequence of packets of data has arrived at MS 114, the missing packets have also arrived, possibly. As such, the bandwidth of the wireless links is used efficiently with minimal or no idle time.

In further aspects of the invention, the mobile station 114 receives out of sequence the sequentially numbered packets of data via wireless connection 164. The mobile station 111 transmits the requested packet of data (i.e. the missing packet) via the wireless connection 161 to BTS 121. The mobile station 114 receives via wireless connection 164 the requested packet of data and inserts the requested packet of data in sequence with other packets of data of sequentially numbered packets of data to form the packets of data in sequence.

In further aspects of the invention, at least one of the land-based communication resources including the detecting and subsequent in series to the detecting communication resources, such as BTS 121, BSC 131, BSC 132 and BTS 125 records a sequence number of the missing packet of data. Preferably, the recording most likely takes place at the BTS 125 (or at BSC 132) that is in wireless communication with MS 114. When the recording resource receives a request from the mobile station 114 via the wireless connection 164 to send the missing packet of data, the recording resource compares the identification of the recorded missing packet of data to the identification of the requested missing packet of data. If the identification of the recorded missing packet of data does not match to the identification of the requested missing packet of data, the recording unit requests from communication resources in series prior to the last land-based communication resource including the mobile station 111 to send the requested missing packet of data; if the identification of recorded missing packet of data matches to the identification of the requested missing packet of data, the recording unit waits for arrival of the requested missing packet of data. Subsequently, when requested missing packet of data arrives, the recording resource transmits the requested missing packet of data to the mobile station 114. The comparison of the identification may be necessary to eliminate duplication of request for retransmission of the missing packets of data. Moreover, the missing packets of data may be due to parts of communication link involved in communication resources subsequent to the detecting communication resource, such as wireless link 164. In alternative, the last land-based communication resource may record in a memory buffer one or more of the packets of data transmitted to the mobile communication resource 114. In this case, there is no need to send a request to communication resources in series prior to the last land-based communication resource including the mobile station 111 to send the requested missing packet of data when the identification of the missing packets and the requested packets does not match and the missing packet is already in the buffer memory. If the missing packet is already in the memory buffer at the last land-based communication resource, the loss of packets most likely is due to poor wireless communication between the last land-based communication resource and the second mobile communication resource.

In further aspect of the invention, there may be a need for detecting the type of sequentially numbered packets of data. The invention may be involved only in communication of data type information. Other types of information, such as voice information, may need to be sent sequentially to the destination mobile communication resource in order to keep the coherency of the voice communication after it is decoded at the destination mobile station. Since voice information pass through a vocoder, an element known in the relevant art, in order to be coded appropriately for transmission over a communication link, the detecting mean for detecting the type of packets of data may involve checking whether the information being transmitted bypass the vocoder. If the information data bypass the vocoder, the information data is of a data type.

The implementation of the invention is not specific to one or more types of communication system. In a preferred embodiment, the invention improves performance of a code division multiple access (CDMA) communication system mobile to mobile data calls. Mobile to mobile data calls using IS-99, IS-707 or IS-707A RLP protocol can produce significant data bandwidth degradation due to buffering by a centralized BSC (CBSC) RLP when erasures are detected. Erasures on the up-link data paths require that the CBSC RLP implementation buffer frames while waiting for a frame to be retransmitted by the mobile. The act of waiting for up-link data retransmissions leads to data starvation on the down-link data path. The down-link RLP is forced to transmit idle frames in this scenario which represents a lost opportunity to transmit data to the mobile.

Figure 2:
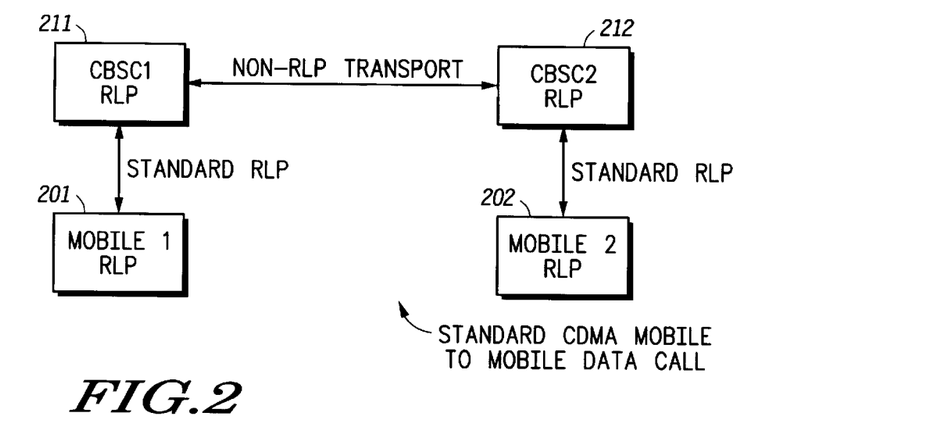
FIG. 2 depicts a standard CDMA mobile to mobile data call.
Figure 3:
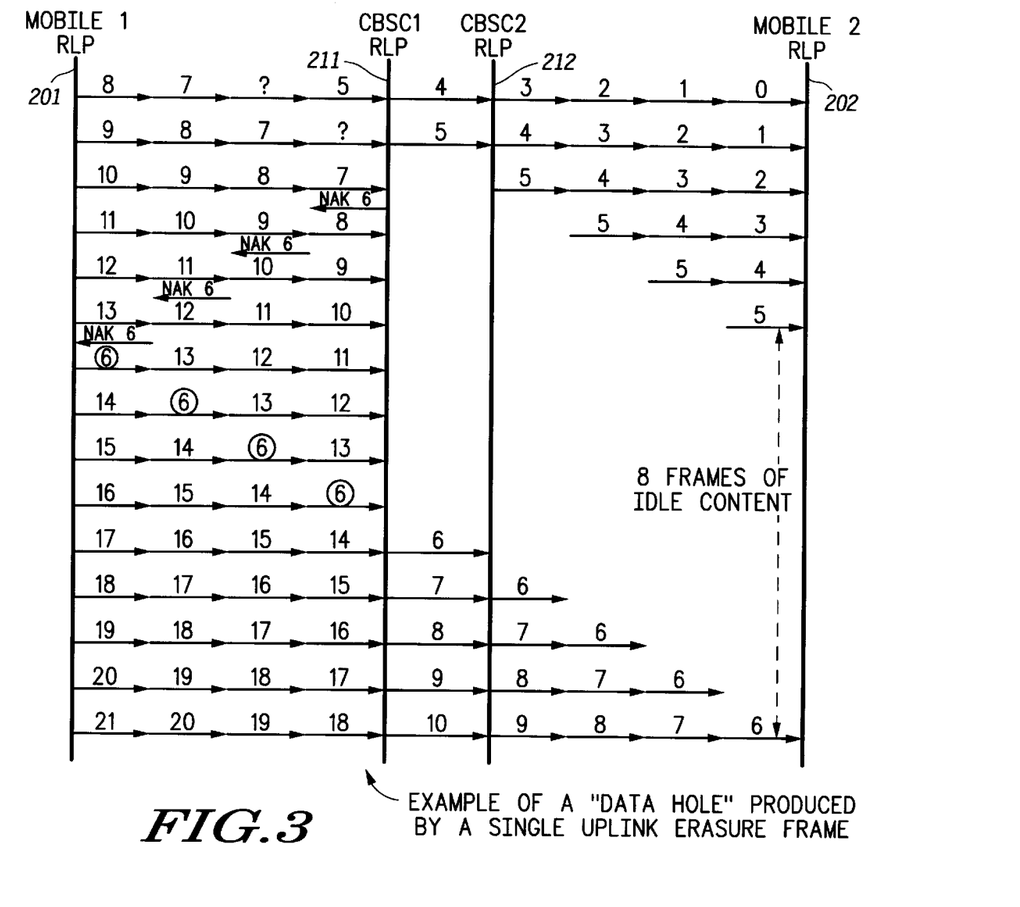
FIG. 3 illustrates bandwidth degradation according to prior art.

FIG. 2 shows a standard CDMA mobile to mobile data call, mobile 201 to mobile 202. In this case, RLP exists between each mobile and its immediate CBSC counter part, such as CBSC 211 and 212, and another transport protocol carries data between the two channels on the CBSCs 211 and 212. The BTS blocks are not shown. There is no direct correspondence between the up-link RLP and down-link RLP framing. FIG. 3 illustrates the bandwidth degradation due to a data transfer from mobile 201 to mobile 202 when an erasure occurs (packet number 6) on the up-link data path from mobile 201. The packets of data are sequentially numbered from packet 0 to 21. Packet number and frame number are interchangeable terms. For visualization purposes, the CBSC 211–CBSC 212 transport shows the RLP frame sequence numbers, however, in reality no knowledge of RLP framing is available on the receive side of the transport protocol. Using typical values of delay (propagation plus processing delay) between the RLP implementations, a single frame erasure on the up-link data path creates an 8 frame data gap on the down-link data path while the lost frame is recovered. If an FER rate of 1% is targeted using IS-707, the overall experienced data path bandwidth reduction is 9% (1% for down-link losses from CBSC 212 to mobile 202 plus 8% due to the up-link losses from Mobile 201 to CBSC 211.) For IS-707A, the losses on the down-link path are actually 2%, so the total bandwidth reduction for that case is 10%. This is significantly larger than the 1% (or 2%) expected degradation for a Land to Mobile or Mobile to Land calls in a similar situation. To compound the problem, larger FER targets (3%–5%) for data calls have been considered as a system capacity enhancement. This could increase the overall bandwidth degradation to 25–40%. In addition to the bandwidth reduction effect, a series of frames are buffered within the CBSC 211 that cannot be transmitted to CBSC 212 until the RLP traffic is reduced. This funneling effect could eventually cause the RLP protocol to fail due to buffer overflows. Additional problem of the actual throughput reduction depends not only on the target FER, but also variances in the propagation and processing delays between the CBSCs and mobiles involved in the call.

Figure 4:
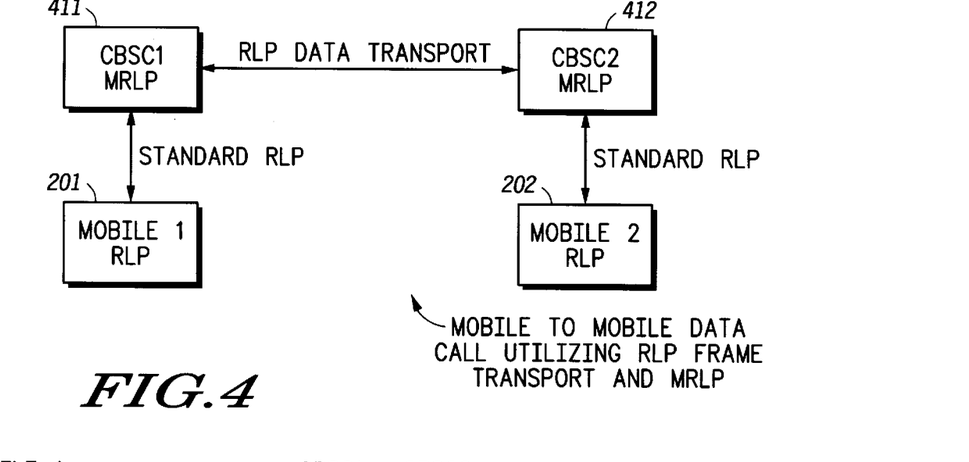
FIG. 4 depicts a communication system configuration according to various aspects of the invention.

The invention requires no modification to the mobile operation or its protocol operation with land-based communication resources. FIG. 4 shows the system configuration necessary to provide a modified RLP (MRLP) support for eliminating the down-link idle time associated with a situation shown in FIG. 3. This configuration is similar to the configuration shown in FIG. 2, except that a CBSC 411–CBSC 412 data path retains the RLP framing information and the two CBSCs 411 and 412 implement the modified RLP algorithm according to various aspects of the invention. RLP initialization/synchronization is established between each mobile and its CBSC counterpart as for a normal land to mobile or mobile to land calls. After synchronization is established, each RLP maintains the standard negative acknowledgment (NAK) based control messaging between CBSC and mobile, and data frames are forwarded to the peer MRLP and then to the mobile with RLP framing information. When an erasure occurs on the up-link data path, the frame is NAK'd by the corresponding MRLP as in a normal call, however, while the up-link MRLP is waiting for frame retransmission, subsequent data frames are forwarded to the peer MRLP rather than buffered. The peer down-link MRLP forwards these frames to the mobile with the expectation (according to standard RLP implementation) that the mobile will NAK the missing frame and buffer subsequent data frames until the missing frame is retransmitted and received. The down-link MRLP will also detect the missing data frame and record this information to determine which NAKs received from the mobile are to be honored (i.e. due to down-link losses) and which have already been NAK'd by the peer MRLP application (i.e. due to up-link losses). When a NAK frame is received by the up-link MRLP process, it compares the NAK request with the recorded information to determine if the NAK was expected due to a known missing up-link frame or is a new lost frame caused by a down-link erasure.

Figure 5:
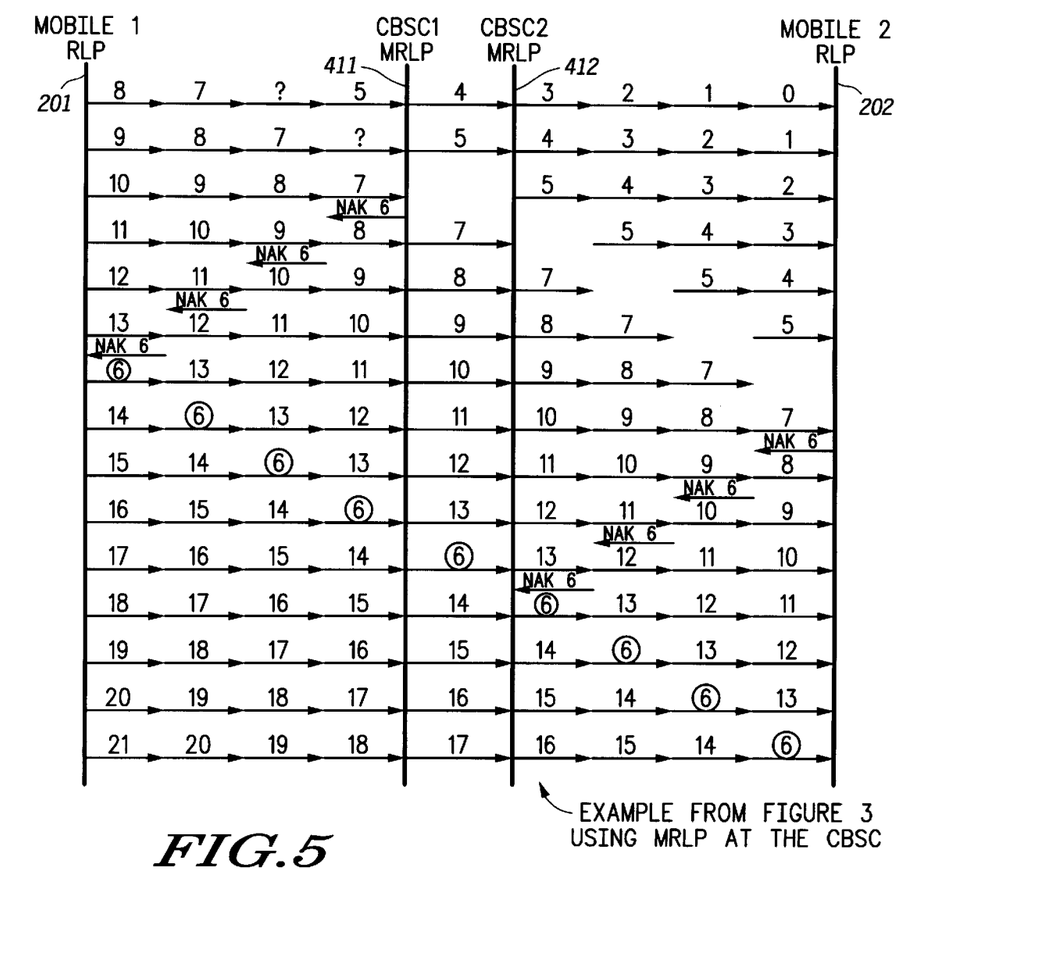
FIG. 5 illustrates improvements in bandwidth utilization according to the invention.

FIG. 5 shows the same erasure scenario as shown in FIG. 3 using the MRLP approach with its improved performance. In this case, the missing frame is NAK'd by CBSC 411 but frames are still forwarded to CBSC 412 MRLP for transmission to mobile 202. When mobile 202 detects the missing frame, it will NAK the frame to CBSC 212, however, CBSC 212 is aware that this frame had already been NAK'd by CBSC 211 and is on its way, so CBSC 212 will ignore this request. The net result is that the frame erasure on the up-link results in only a single frame data hole as seen by mobile 202, which is equivalent to the performance of RLP for land to mobile and mobile to land calls. In addition to enhancing data bandwidth, the invention also avoids the funneling effect observed in the original example since data buffering is performed at the mobile after crossing the air interface rather than at the CBSC 411. The invention also eliminates performance impacts due to propagation and processing delay.

Figure 6:
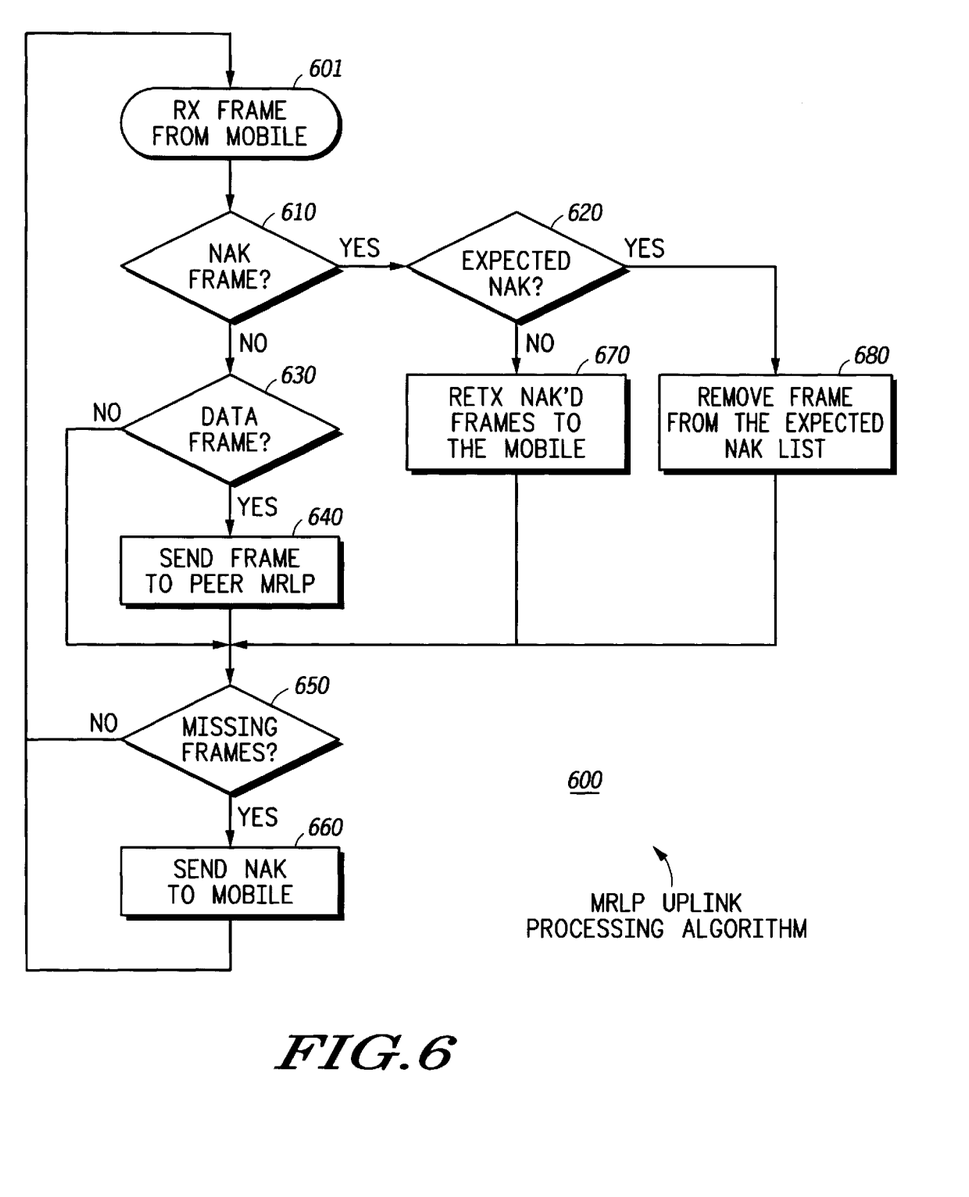
FIG. 6 depicts a simplified version of an up-link algorithm according to various aspects of the invention.
Figure 7:
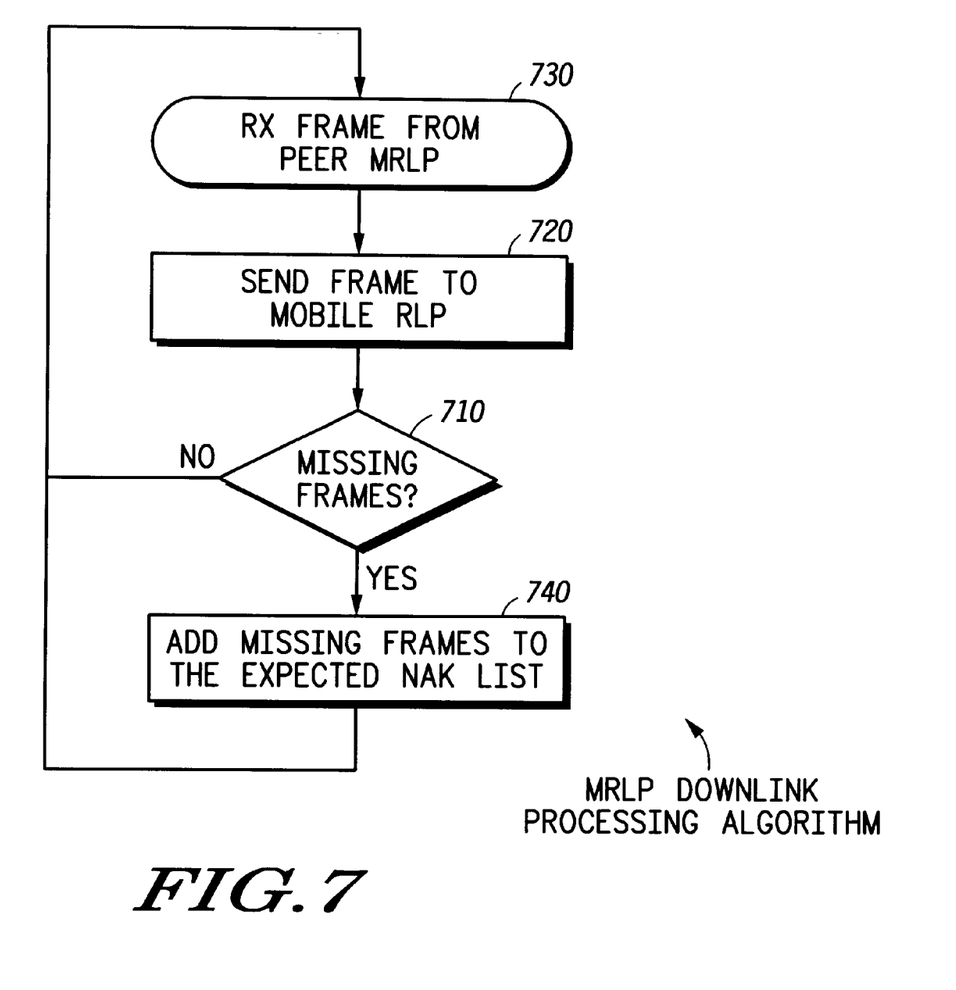
FIG. 7 depicts a simplified version of a down-link algorithm according to various aspects of the invention.

The MRLP algorithms, in a simplified form, are provided in FIGS. 6 and 7 for up-link MRLP and down-link MRLP respectively. An up-link MRLP algorithm 600 includes cross referencing NAK frames at 610 of the received frames at 601 from the mobile with those in the Expected NAK list at 620. Detecting whether the frames are of data types at 630. If the frames are not of a data type, then bypass a send frames to peer MRLP at 640. In case of a missing frame at 650, send a NAK message to the mobile station at 660. At 640 send the frames out of sequence to the peer MRLP CBSC without buffering the data. For simplicity, the NAK timer algorithm is not shown for the up-link MRLP process, however, the timing algorithm may be equivalent to the IS-707 (or IS-707A) NAK timer algorithm. At 670 and 680, the NAK messages are managed accordingly. A down-link MRLP algorithm 700 shown in FIG. 7 includes detecting missing frames at 710 sent by the peer up-link MRLP at 720 and 730. The algorithm allows registering at 740 the identification of the missing frames in an Expected NAK list.

The MRLP according to the invention provides greater potential throughput for mobile to mobile CDMA data calls over the standard RLP implementation. Standard RLP implementations can typically suffer ~10% reduction in the maximum throughput due to a target FER of only 1%. This can be compared with a land to mobile or mobile to land call with the same target FER which only suffers a 1% maximum throughput reduction. The invention improves the throughput resulting in only a 2% maximum throughput reduction due to an FER target of 1%, which is the best attainable performance for mobile to mobile due to the double air link required 2 air links@1% FER=2% throughput reduction. The MRLP requires only modification to the CBSC RLP implementation and CBSCCBSC transport protocol for mobile to mobile data calls. The algorithm works with the known behavior of the standard mobile RLP to produce the desired effect, thus requiring no modification to the existing mobile algorithms and producing no RLP compatibility problems.

What is claimed is:
1. A method in a communication system comprising the steps of:
    establishing a communication link between a first and second mobile communication resources via a series of land-based communication resources, said land-based communication resources having a first and last land-based communication resources, wherein said first mobile communication resource having a first wireless connection, as a first part of said communication link, with said first land-based communication resource, and said second mobile communication resource having a second wireless connection, as a last part of said communication link, with said last land-based communication resource;

transmitting in sequence sequentially numbered packets of data via said first wireless connection from said first mobile communication resource to said first land-based communication resource;

detecting reception of out of sequence packets of data received at a receiving portion of a detecting communication resource, wherein said detecting communication resource is at least one of said series of land20 based communication resources;

transmitting out of sequence said sequentially numbered packets of data from a transmitting portion of said detecting communication resource to communication resources subsequent in series to said detecting communication resource.

2. The method as recited in claim 1 further comprising the steps of:

receiving out of sequence said sequentially numbered packets of data
at said second mobile communication resource via said second wireless connection;

requesting to send at least one packet of data of said sequentially numbered packets of data;

transmitting said least requested packet of data via said first wireless connection from said first mobile communication resource to said first land-based communication resource;

receiving via said second wireless connection said least requested packet of data at said second mobile communication resource, and inserting said least requested packet of data in sequence with other packets of data of sequentially numbered packets of data to form said packets of data in sequence at said second mobile communication resource.

3. The method as recited in claim 1 further comprising the steps of:

recording a sequence number of at least one missing packet of data of said
out of sequence packets of data at one of said land-based communication resources including said detecting and subsequent in series to said detecting communication resources;

receiving a request from said second mobile communication resource via said second wireless connection to said last land-based communication resource to send said least one missing packet of data;

comparing at said last land-based communication resource identification of recorded said missing packet of data to identification of said requested missing packet of data, and requesting, from communication resources in series prior to said last land-based communication resource including said first mobile communication resource or a memory buffer in said last land-based communication resource, to send said requested missing packet of data if identification of recorded said missing packet of data to identification of said requested missing packet of data does not match, and waiting for arrival of said requested missing packet of data if identification of recorded said missing packet of data to identification of said requested missing packet of data match and transmitting said requested missing packet of data to said second mobile communication resource when requested missing packet of data arrives.

4. The method as recited in claim 1 wherein said communication system operates according to a code division multiple access communication system protocol.

5. An apparatus in a communication system comprising:

a first mobile communication resource;

a second mobile communication resource;

a series of land-based communication resources providing a communication link between said first and second mobile communication resources, said land-based communication resources including a first and last communication resources, said first land-based communication resource communicating via a first wireless connection to said first mobile communication resource, and said last land-based communication resource communicating via a second wireless connection to said second mobile communication resource, wherein said first and second wireless connections are respectively the first and last parts of said communication link between said first and second mobile communication resources and through said land-based communication resources, wherein said first mobile communication resource transmits in sequence sequentially numbered packets of data via said first wireless connection to said first land-based communication resource for routing through said series of land-based communication resources, including said last land-based communication resource, to be received by said second mobile communication resource via said second wireless connection, wherein a detecting land-based communication resource of at least one of said series of land-based communication resources detects reception of out of sequence packets of data received at a receiver portion of said detecting land-based communication resource, and a transmitter portion of said detecting land-based communication resource transmits out of sequence said sequentially numbered packets of data to communication resources subsequent in series to said detecting communication resource including said second mobile communication resource.

6. The apparatus as recited in claim 5 further comprising:

means for requesting to send said at least one of packet of data of said sequentially numbered packets of data, wherein said means for requesting incorporated in said detecting land-based communication resource;

means for transmitting said least requested packet of data via said first wireless connection from said first mobile communication resource to said first land-based communication resource, wherein said means for transmitting incorporated in said first mobile communication resource;

means for receiving via said second wireless connection out of sequence
said sequentially numbered packet of data at said second mobile communication resource via said second wireless connection and said least requested packet of data at said second mobile communication resource, and means for inserting said least requested packet of data in sequence with other packets of data of sequentially numbered packets of data to form said packets of data in sequence at said second mobile communication resource, wherein said means for receiving and inserting incorporated in said second mobile communication resource.

7. The apparatus as recited in claim 5 further comprising:

means for recording a sequence number of at least one missing packet of data of said out of sequence packets of data at one of said land-based communication resources including said detecting and subsequent in series to said detecting communication resources;

means for receiving a request from said second mobile communication resource via said second wireless connection to said last land-based communication resource to send said least one missing packet of data;

means for comparing at said last land-based communication resource identification of recorded said missing packet of data to identification of said requested missing packet of data, and requesting, from communication resources in series prior to said last land-based communication resource including said first mobile communication resource or a memory buffer in said last land-based communication resource, to send said requested missing packet of data if identification of recorded said missing packet of data to identification of said requested missing packet of data does not match, and waiting for arrival of said requested missing packet of data if identification of recorded said missing packet of data to identification of said requested missing packet of data match and transmitting said requested missing packet of data to said second mobile communication resource when requested missing packet of data arrives.

8. The apparatus as recited in claim 5 wherein said communication system operates according to a code division multiple access communication system protocol.

* * * * *